United States Patent
Floch et al.

(10) Patent No.: US 11,006,533 B2
(45) Date of Patent: May 11, 2021

(54) FRAME FOR A DISPLAY DEVICE, DISPLAY DEVICE, AND METHOD OF MANUFACTURING THE SAME

(71) Applicant: FAURECIA INTERIEUR INDUSTRIE, Nanterre (FR)

(72) Inventors: Francois Floch, Chantilly (FR); Maureen Seze, Champagne sur Oise (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 16/789,760

(22) Filed: Feb. 13, 2020

(65) Prior Publication Data

US 2020/0267848 A1 Aug. 20, 2020

(30) Foreign Application Priority Data

Feb. 19, 2019 (FR) .................................. 19 01646

(51) Int. Cl.
| | |
|---|---|
| H05K 5/00 | (2006.01) |
| B60R 11/02 | (2006.01) |
| F16M 13/02 | (2006.01) |
| H05K 5/02 | (2006.01) |
| B60R 11/00 | (2006.01) |

(52) U.S. Cl.
CPC ........ H05K 5/0017 (2013.01); B60R 11/0235 (2013.01); F16M 13/02 (2013.01); H05K 5/0213 (2013.01); B60R 11/0258 (2013.01); B60R 2011/0005 (2013.01); B60R 2011/0019 (2013.01); B60R 2011/0021 (2013.01)

(58) Field of Classification Search
None
See application file for complete search history.

(56) References Cited

U.S. PATENT DOCUMENTS

| | | | | |
|---|---|---|---|---|
| 2006/0255960 | A1* | 11/2006 | Uken ..................... | B60R 1/088 |
| | | | | 340/815.4 |
| 2018/0070465 | A1* | 3/2018 | Cater ...................... | H01Q 1/24 |
| 2018/0110143 | A1* | 4/2018 | Zhao ..................... | H04M 1/026 |
| 2019/0196560 | A1* | 6/2019 | Cha ..................... | H04M 1/0279 |
| 2019/0317357 | A1* | 10/2019 | Kishimoto ........ | G02F 1/133308 |

FOREIGN PATENT DOCUMENTS

| | | |
|---|---|---|
| DE | 102015226025 A1 | 6/2017 |
| WO | WO2019016223 A1 | 1/2019 |

OTHER PUBLICATIONS

French Search Report corresponding to French Application No. FR 1901646, dated Oct. 4, 2019, 2 pages.
Written Opinion corresponding to French Application No. FR 1901646, dated Oct. 4, 2019, 4 pages.

* cited by examiner

*Primary Examiner* — Xanthia C Cunningham
(74) *Attorney, Agent, or Firm* — Reising Ethington P.C.

(57) ABSTRACT

A frame for a display device extends in a main plane. The frame includes a plurality of segments coupled to one another, including at least a first segment having at least one injection orifice allowing the injection of an optical adhesive. The plurality of segments defines an opening therebetween delimited by a plurality of inner edges facing each segment, including at least a first inner edge of the first segment. The first segment includes an injection channel having a first end and a second end. The first end is fluidly connected to the injection orifice, and the second end forms the first inner edge of the first segment.

10 Claims, 2 Drawing Sheets

FRAME FOR A DISPLAY DEVICE, DISPLAY DEVICE, AND METHOD OF MANUFACTURING THE SAME

This application claims the benefit of French Patent Application No. FR 19 01646 filed on Feb. 19, 2019, which is hereby incorporated by reference.

TECHNICAL FIELD

The disclosure relates a display device that can be integrated into a trim element of a vehicle, such as a dashboard covering, a door panel or the like. The disclosure also relates to a frame for the display device and a method for manufacturing such a display device.

BACKGROUND

A display device can be integrated into a trim element of a vehicle, such as a dashboard covering, a door panel or the like. Such a display device is typically configured to display information useful for the driver and/or passengers, for example geolocation navigation information, icons, etc. and/or audiovisual content. Such a display device may include an optical adhesive arranged between first and second optical surfaces to improve the transmission of light and the optical performance of the display, for example by limiting the reflections or improving the display contrast. This is particularly advantageous inside the passenger compartment of a vehicle, where the brightness varies greatly as a function of the movement of the vehicle. Also, the adhesive can improve the resistance and the longevity of the display device. Owing to the adhesive layer, the first optical surface can be protected from impacts and scratching and be less susceptible to substantial temperature differentials, etc.

Conventionally, to attach the two optical surfaces to one another, a quantity of adhesive is deposited along a central line or along diagonals of the first optical surface. Then, the second optical surface is arranged above the first optical surface while making sure to distribute the adhesive uniformly between the two optical surfaces. This method has the drawback of creating air bubbles inside the adhesive layer or at the interfaces between the adhesive and the optical surfaces. Additionally, the distribution of the adhesive on the entire optical surface is a delicate operation that most often causes runs at the periphery of the optical surfaces, and causes a deterioration of the quality of the image displayed by the display device.

SUMMARY

Embodiments of the invention relate to a frame for a display device having at least a first optical surface, which may generate the images of the display device, and a second optical surface, on which the generated images may be displayed. The optical surfaces are assembled on a frame extending in a main plane, the frame comprising a plurality of segments coupled to one another, including at least a first segment comprising at least one injection orifice allowing the injection of an optical adhesive, the plurality of segments defining an opening between them delimited by a plurality of inner edges facing each segment, including at least a first inner edge of the first segment. The first segment may include an injection channel comprising a first end and a second end, the first end being fluidly connected to the injection orifice, the second end forming the first inner edge of the first segment.

The injection channel makes it possible to inject the adhesive between the two optical surfaces in the form of a ply while generating a uniform adhesive front that moves from the first edge toward the opposite edge, while gradually and uniformly filling in the space between the two optical surfaces. The air present between the two optical surfaces is driven out and the appearance of air bubbles in the interjected layer is avoided.

According to various embodiments, the frame has one or more of the features below, considered individually or according to any technical possible combination:

the plurality of segments comprises at least one second segment including at least one vent orifice allowing the discharge of a fluid driven out by the optical adhesive;

the second segment is substantially parallel to the first segment;

the plurality of segments defines a plurality of corners, the frame comprising at least one vent orifice arranged in a corner;

the first segment comprises two ends, the injection orifice being arranged substantially equidistantly between the two ends;

the projection of the injection channel in the main plane is triangular;

the projection of the injection orifice in the main plane is substantially coincident with the apex of the triangle, the first inner edge forming the base of the triangle; and/or the frame comprises at least one spacing member configured to maintain a constant distance between a first optical surface and a second optical surface, the first optical surface and the second optical surface being configured to be attached on the frame.

Embodiments of the invention also relate to a display device comprising a frame, at least a first optical surface and a second optical surface that are assembled on the frame, the first optical surface and the second optical surface delimiting an inner volume, a second end of an injection channel of the frame being in fluid communication with the inner volume, and a layer of optical adhesive arranged in the inner volume.

Embodiments of the invention also relate to a method for manufacturing a display device comprising the steps of: providing a frame, attaching a first optical surface on the frame, attaching a second optical surface on the frame, and injecting an optical adhesive in an inner volume through an injection orifice and an injection channel of the frame.

BRIEF DESCRIPTION OF THE DRAWINGS

Other features and advantages will emerge from the detailed description thereof provided below, for information and non-limitingly, in reference to the appended figures, in which.

DETAILED DESCRIPTION OF EMBODIMENTS

The following disclosure proposes a frame for a display device that makes it possible to address some of the above drawbacks and to obtain a display device with a homogeneous distribution of the adhesive limiting the appearance of air bubbles.

In the following disclosure, the term "translucent" refers to a body transmitting light, that is to say, having a light transmission rate of between 5% and 100%.

The term "transparent" refers to a body transmitting light by refraction and through which objects are clearly visible, that is to say, a body representing a light transmission rate greater than 95%, for example close to 100%.

The light is considered in the visible domain, that is to say, made up of electromagnetic waves whose wavelength is generally between 380 nm and 780 nm.

Figure 1:
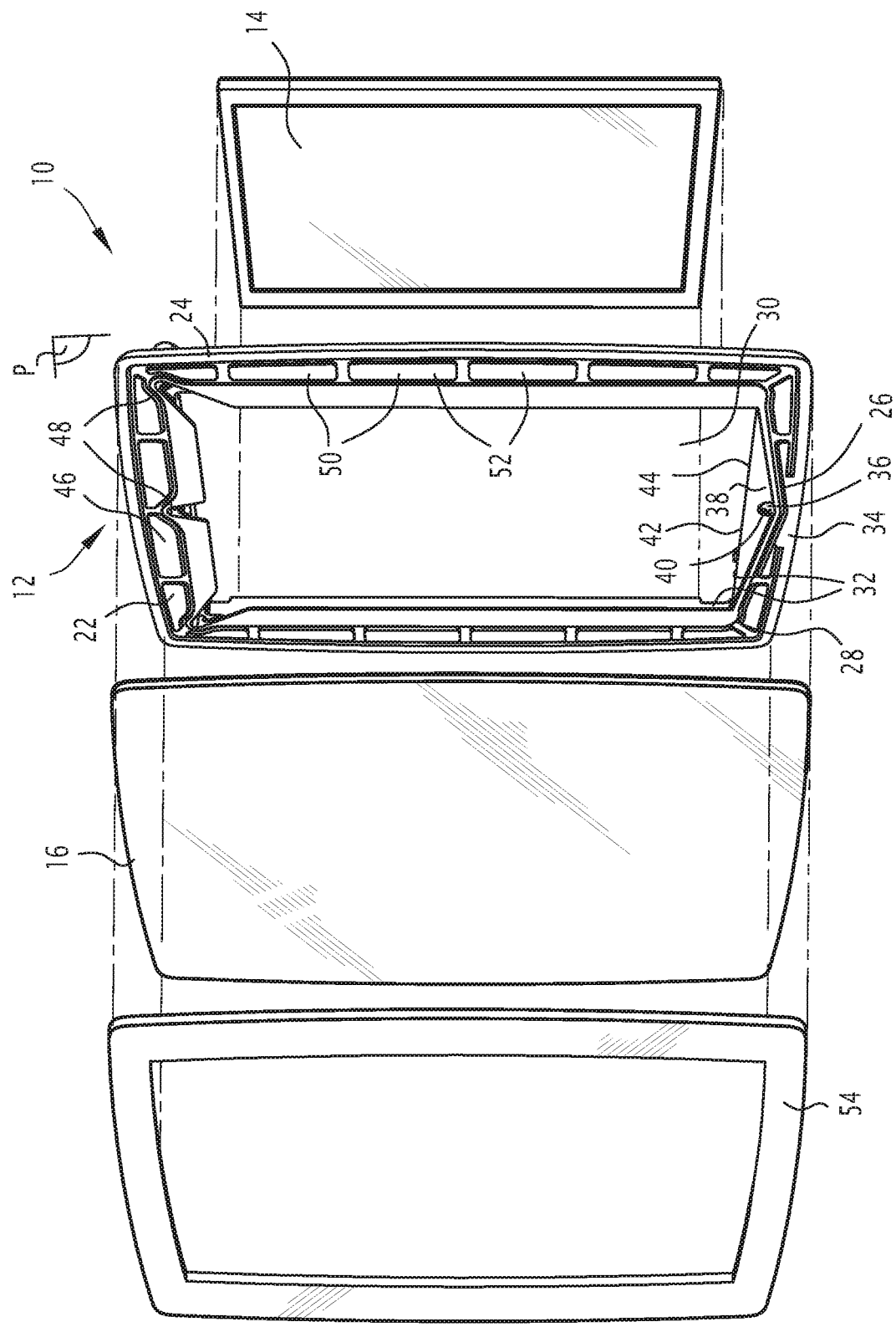
FIG. 1 is an exploded perspective view of a display device according to embodiments of the invention.

FIG. 1 shows an exploded view of a display device 10 according to the invention. The display device 10 extends primarily in a main plane P and in planes substantially parallel to the main plane. The display device 10 comprises a frame 12, at least a first optical surface 14 and a second optical surface 16 that are assembled on the frame 12.

The display device 10 is for example a navigation assistant and/or a screen for displaying audiovisual content configured to be attached to the inside of the passenger compartment of a vehicle, in particular in a trim panel of the vehicle.

The first optical surface 14 is for example a screen surface generating images.

The second optical surface 16 is for example a protection element or a lens on the outer surface of which the images generated by the first optical surface 14 are displayed.

In a variant, the first optical surface 14 and/or the second optical surface 16 are actuated by touch, for example by covering them with a capacitive film. Actuation by touch means that the display device 10 and certain functions related to the information displayed by the latter are controllable by touch-sensitive contact with the second optical surface 16.

The frame 12, the first optical surface 14 and the second optical surface 16 delimit an inner volume 18.

The display device 10 further comprises an optical adhesive layer 20 (FIG. 2) filling in the inner volume 18.

The optical adhesive 20 is for example a liquid or a gel whose viscosity allows a flow of the optical adhesive 20.

The adhesive 20 is transparent or translucent, such that the images emitted by the first optical surface 14 are transmitted to the second optical surface 16 without deterioration of the quality of these images.

The frame 12 comprises an upper surface 22 configured to be oriented toward the user and a lower surface 24 located opposite the upper surface 22, which is substantially parallel to the upper surface 22 and at a distance therefrom. The first optical surface 14 is for example attached to the lower surface 24 of the frame 12. The second optical surface 16 is for example attached to the upper surface 22 of the frame 12.

The attachment of the first optical surface 14 and the second optical surface 16 to the frame 12 is for example done by gluing.

According to the embodiment of FIG. 1, the attachment of the first and second optical surfaces 14, 16 is airtight and liquid-tight.

In a variant or additionally, the frame 12 comprises members (not shown) for holding the first optical surface 14 on the frame 12, for example by snapping.

The frame 12 comprises a plurality of segments 26 coupled to one another, defining a plurality of corners 28.

In the example of FIG. 1, the frame 12 comprises four segments 26 defining four corners 28.

The segments 26 define an opening 30 between them delimited by a plurality of inner edges 32 across from each of the segments 26. Each corner 28 is defined between two consecutive inner edges 32.

In the example of FIG. 1, the opening 30 is substantially rectangular, that is to say, the corners 28 are substantially equal to 90°.

Among the plurality of segments 26, the frame 12 comprises at least a first segment 34 including an injection orifice 36 allowing the injection of the optical adhesive toward the inner volume 18. The injection orifice 36 is thus in fluid communication with the outside of the display device 10 on the one hand and the inner volume 18 on the other hand.

For example, the injection orifice 36 is arranged substantially equidistantly from the two ends of the first segment 34.

The injection orifice 36 is for example configured to be connected to an optical adhesive supply device configured to inject said optical adhesive.

The first segment 34 comprises an injection channel 38 including a first end 40 and a second end 42.

The first end 40 is fluidly connected to the injection orifice 36.

The second end 40 forms the first inner edge 44 of the corresponding first segment 34.

The second end 40 of the injection channel 38 is in fluid communication with the inner volume 18 defined by the frame 12, the first optical surface 14 and the second optical surface 16. In other words, the fluid communication between the injection orifice 36 and the inner volume 18 is provided by the injection channel 38.

Thus, the injection channel 38 makes it possible to inject the optical adhesive uniformly along the first inner edge 44, then in the inner volume 18.

Advantageously, the projection of the injection channel 38 in the main plane P is triangular. The projection of the injection orifice 36 in the main plane P is substantially coincident with the apex of the triangle. The first inner edge 44 forms the base of the triangle.

The triangular shape of the injection channel 38 makes it possible to create a uniform optical adhesive flow front. The adhesive flows from the apex of the triangle along the two lateral edges of the injection channel 38 until it occupies the entire base of the triangle, which corresponds to the width of the frame.

Preferably, at least one second segment 46 of the frame 12 comprises at least one vent orifice 48 allowing the discharge of the fluid present in the inner volume 18 driven out by the adhesive.

The fluid is for example air, nitrogen, argon. The fluid is at ambient pressure or compressed.

The vent hole 48 places the inner volume 18 in fluid communication with the outside of the frame 12. The vent orifice 48 is a through orifice and for example emerges on the lower surface 24 of the frame 12.

In a variant or additionally, the frame 12 comprises at least one vent orifice 48 arranged in a corner 28 formed by the segments 26 of the frame 12. The vent orifice 48 is also a through orifice and for example emerges on the lower surface 24 of the frame 12.

In the example of FIG. 1, the frame 12 comprises a first vent orifice 48 arranged on the second segment 46 substantially parallel to the first segment 34 comprising the injection orifice 36.

The vent orifice 48 is preferably arranged on a second segment 46 of the plurality of segments 26 opposite the first segment 34.

The frame 12 of FIG. 1 further comprises a second and a third vent orifice 48 arranged in the corners 28 formed by the second segment 46 and respectively the two adjacent segments 26.

Advantageously, the frame 12 according to the invention comprises at least one spacing member 50 configured to maintain a constant distance between the first optical surface 14 and the second optical surface 16.

The distance between the first optical surface 14 and the second optical surface 16 is for example between 0.5 mm and 2 mm, for example 1 mm.

In the example of FIG. 1, the frame 12 comprises a plurality of spacing members 50 formed by protuberances 52 protruding toward the outside of the frame 12.

The protuberances 52 are for example arranged on the perimeter of the frame 12 along each segment 26.

Preferably, the display device 10 comprises a layer of screenprinting 54 arranged on the second optical surface 16 in order to conceal the perimeter of the frame 12, and more specifically the injection orifice(s) 36, the vent orifice(s) 48 and the protuberances 52. Thus, only the central part of the first optical surface 14 is visible by the user, which improves the appearance of the display device 10.

In a variant, the display device 10 comprises an outer concealing frame (not shown) arranged on the second optical surface 16 that performs the same function as the screenprinting layer 54 disclosed above.

A method for manufacturing a display device 10 will now be described.

The method first comprises providing a frame 12 as disclosed above, a first optical surface 14 and a second optical surface 16.

The first optical surface 14 is first attached on the frame 12, for example by gluing.

Then, the second optical surface 16 is attached on the frame 12, on the upper part 22 of the frame 12, preferably by gluing. The spacing members 50 ensure that a constant distance is maintained between the first optical surface 14 and the second optical surface 16.

The optical adhesive is next injected through the injection orifice 36 into the inner volume 18 defined by the frame 12, the first optical surface 14 and the second optical surface 16 using an optical adhesive supply device. The adhesive then fills the injection channel 38, then gradually fills the inner volume 18 by driving out the air present in the inner volume 18. The air is expelled from the inner volume 18 by the vent orifice(s) 48.

Figure 2:
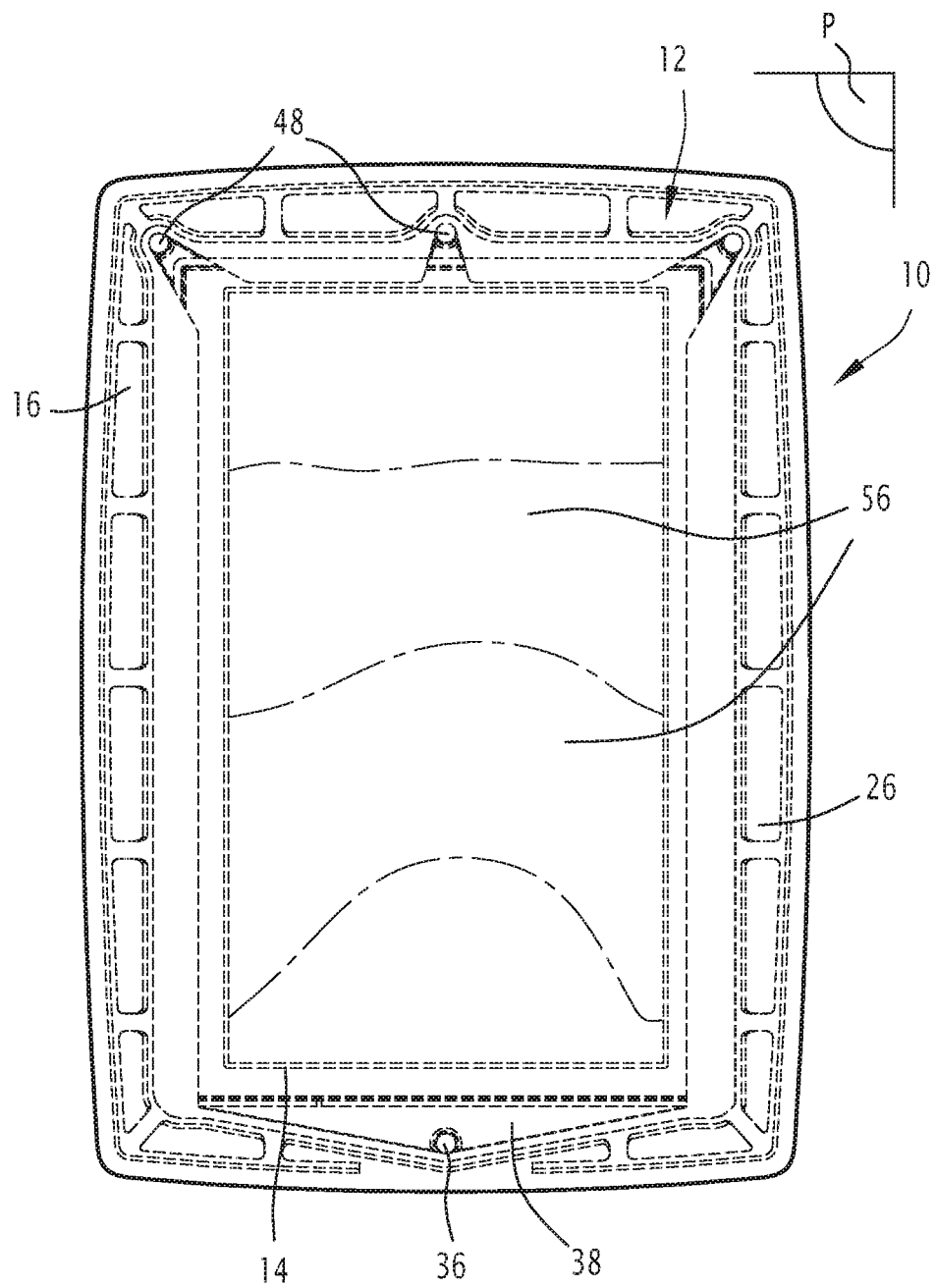
FIG. 2 shows the progression of an optical adhesive front in the display device of FIG. 1 during the injection of the adhesive.

As shown in FIG. 2, the optical adhesive front 56 progresses in the inner volume 18 until filling it completely.

The optical adhesive flow rate is for example between 100 and 400 ml/minute.

Preferably, the layer of screenprinting 54 is printed on the second optical surface 16 to conceal at least part of the perimeter of the frame.

For example, the layer of screenprinting 54 is printed on the face oriented toward the first optical surface 14.

In a variant, the layer of screenprinting is printed on the face configured to be oriented toward the outside of the frame 12.

Also in a variant, in place of a layer of screenprinting, a concealing frame (not shown) is arranged on the second optical surface 16.

Preferably, the step for injection of the optical adhesive is done with the frame 12 in the horizontal position.

Thus, the injection of optical adhesive between the first optical surface 14 and the second optical surface 16 is made easier and the injection in ply form limits the appearance of air bubbles inside the inner volume 18.

According to another embodiment of the invention, the frame 12 does not comprise vent orifices 48. The second optical surface 16 is attached on the frame 12 such that at least part of an attachment zone between the second optical surface 16 and the frame 12 is permeable to air. Thus, during the injection of the adhesive, the air is driven out at said attachment zone as the adhesive front fills the inner volume 18. Preferably, said attachment zone corresponds to the attachment zone between the second optical surface 16 and the second segment 46, that is to say, the segment arranged opposite the first segment 34 including the injection orifice 36.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A frame for a display device extending in a main plane, the frame comprising:
    a plurality of segments coupled to one another, including at least a first segment comprising at least one injection orifice allowing the injection of an optical adhesive, the plurality of segments defining an opening between them delimited by a plurality of inner edges facing each segment, including at least a first inner edge of the first segment,
    wherein the first segment comprises an injection channel comprising a first end and a second end, the first end being fluidly connected to the injection orifice, the second end forming the first inner edge of the first segment.

2. The frame according to claim 1, wherein the plurality of segments comprises at least one second segment including at least one vent orifice allowing the discharge of a fluid driven out by the optical adhesive.

3. The frame according to claim 2, wherein the second segment is parallel to the first segment.

4. The frame according to claim 1, wherein the plurality of segments defines a plurality of corners, the frame comprising at least one vent orifice arranged in a corner.

5. The frame according to claim 1, wherein the first segment comprises two ends, the injection orifice being arranged equidistantly between the two ends.

6. The frame according to claim 1, wherein a projection of the injection channel in the main plane is triangular.

7. The frame according to claim 6, wherein a projection of the injection orifice in the main plane is coincident with an apex of the triangle, the first inner edge forming a base of the triangle.

8. The frame according to claim 1, comprising at least one spacing member configured to maintain a constant distance between a first optical surface and a second optical surface, the first optical surface and the second optical surface being configured to be attached on the frame.

9. A display device comprising the frame according to claim 1, and further comprising:
   at least a first optical surface and a second optical surface that are assembled on the frame, wherein the frame, the first optical surface, and the second optical surface delimit an inner volume, the second end of the injection channel being in fluid communication with the inner volume; and
   a layer of optical adhesive arranged in the inner volume.

10. A method for manufacturing the display device of claim 9, the method comprising the following steps:
   providing the frame;
   attaching the first optical surface on the frame;
   attaching the second optical surface on the frame; and
   injecting the optical adhesive in the inner volume through the injection orifice and the injection channel.

* * * * *